Sept. 30, 1958     W. E. JONES ET AL     2,854,230
GLASS FIBER SPRING UNIT AND METHOD OF MAKING SAME
Original Filed March 13, 1952

INVENTORS.
WILLIAM E. JONES
FRANK A. MAROVICH
BY
ATTORNEYS

United States Patent Office 2,854,230
Patented Sept. 30, 1958

2,854,230
GLASS FIBER SPRING UNIT AND METHOD OF MAKING SAME

William E. Jones, Reseda, and Frank A. Marovich, Los Angeles, Calif., assignors to Vibradamp Corporation, Toledo, Ohio, a corporation of California Continuation of application Serial No. 276,308, March 13, 1952. This application October 31, 1955, Serial No. 543,814

17 Claims. (Cl. 267—1)

This invention relates to cushioning devices or spring units, for example, such as seat cushions, mattresses and other cushioning structures adapted to preferably have individual springing support throughout the area of the cushion.

This application is a continuation of application, Serial No. 276,308, filed March 13, 1952, now abandoned.

It is common in the art of cushioning devices to use sponge rubber or foam rubber or metal springs to secure cushioning effect in seat cushions, mattresses and the like. However, it has not heretofore been considered that glass fibers could be adapted for use in the manufacture of such articles as seat cushions and mattresses.

However, in the co-pending application of Joachim Bush, Serial Number 268,049, filed January 24, 1952, now U. S. Patent No. 2,600,843, of common assignee with this application, there is disclosed a glass fiber shock absorbing or spring material and a process for producing the same that adapts the glass fiber material for resilient springing suspensions.

It is, therefore, an object of this invention to provide a glass fiber spring unit or cushion constructed in a manner to obtain the effects of the action of a plurality of individual springs cooperating to resiliently support an object, and a method of producing such a spring unit or cushion.

It is another object of the invention to produce a spring unit or cushion from a body of glass fibers bonded together in a manner for resilient compression of the body, the body of glass fibers being of uniform density with the glass fiber body being fabricated in a manner to provide a plurality of independently acting resilient spring bodies of glass fibers whereby the spring unit or cushion will support objects of irregular shape in the manner of a mattress or a cushion.

Further objects and advantages will become apparent from the drawings and the following description.

Figure 1:
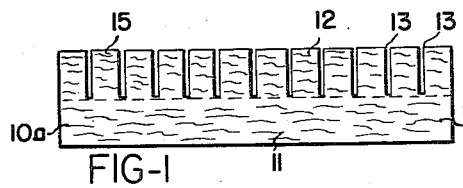
Figure 1 is a side elevational view of a body cushion constructed in accordance with this invention.
Figure 2:
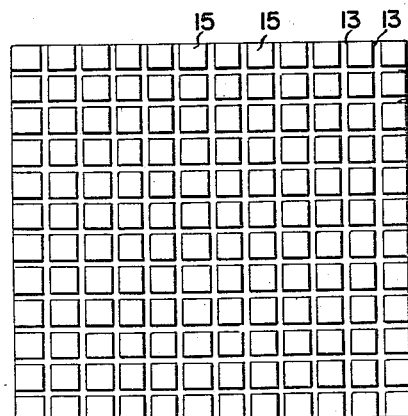
Figure 2 is an elevational view of the body cushion of Figure 1 as viewed from the top side thereof illustrating the independent resilient spring elements.
Figure 3:
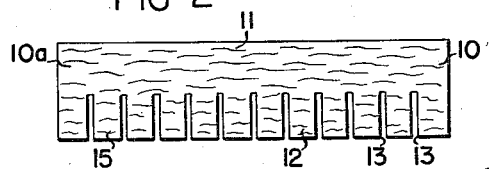
Figure 3 is an end elevational view of the body cushion of Figure 2.
Figure 4:
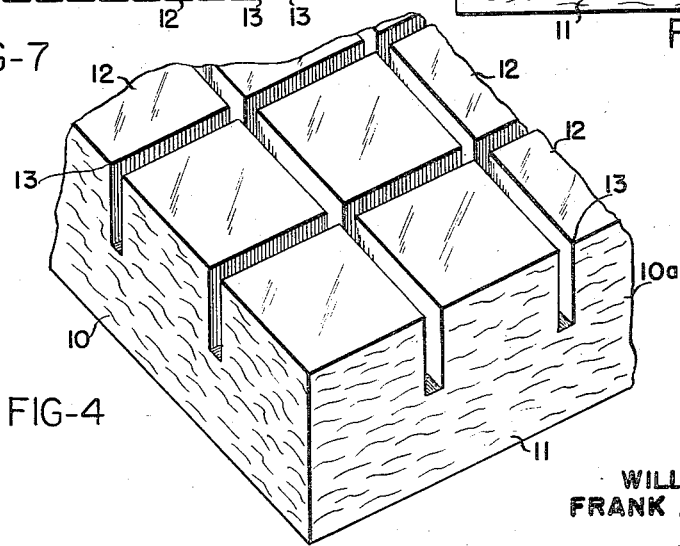
Figure 4 is an enlarged perspective view of one corner of the body cushion.

The glass fiber body cushion of this invention is constructed of a glass fiber material like that disclosed in the co-pending application of Joachim Bush, Serial Number 268,049, filed January 24, 1952, now U. S. Patent No. 2,600,843, and may be produced according to the process disclosed therein. This cushioning or shock absorbing or spring material is composed of an assemblage of glass fibers that are bonded together at controlled uniform densities wherein the bonded glass fibers act as a multiplicity of cantilever springs for resilient support of a structural member with springing action and with shock absorption and dissipation.

As disclosed in the aforementioned application, the shock absorption or spring material is composed of glass fibers that may be produced in any one of several well-known devices by which the glass fibers are collected as a felted assemblage in the form of a mat or a pad. These glass fibers may be long continuous length fibers, or they can be short length staple fibers, or a mixture of them. Preferably, the glass fibers used in the shock absorption or spring material are those having a diameter of between 0.00005 and 0.00025 inch, commonly classified as "B" fiber in the glass fiber industry.

During the course of manufacture of the glass fibers, binding material is applied to the fibers so that each of the fibers is coated with a binding agent when in the assemblage of glass fibers composing the glass fiber mat or pad. The binding agent is of a type that can be subsequently activated or reactivated to cause a bonding between the fibers at their points of juncture. A common binding agent used for this purpose is a phenol-formaldehyde resin.

However, other binding agents such as the various vinyl resins or styrene or silicon resins, or asphaltic compounds, can be used as the binding agent, depending entirely upon the class of use to which the material is placed. The binding agent can be either a thermosetting or a thermoplastic material, here again, depending upon conditions of usage, particularly temperature conditions.

To produce the shock absorption or spring material used in this invention, continuous length or staple length glass fibers of the class heretofore described are brought into an assemblage in the form of a mat or pad. In the normal procedure of producing glass fibers in mat or pad form as collected upon an endless belt moving across the discharge opening of a collecting hood, the glass fibers assume a generally common direction of their disposition relative to one another in that they tend toward parallel arrangement, but due to felting effects of the fibers during the course of their laying down on the endless web on which they are collected, the assembled mat of glass fibers will have fibers disposed angular to one another and angular to the general direction of lay of the fibers, some of the fibers even being normal to the direction of lay.

The mat or assemblage of glass fibers collected on the endless web or belt contain the binder, preferably a phenol-formaldehyde resin in an unpolymerized condition and with the mat being of any desired thickness. It can be generally said that the glass fibers of the mat are positioned horizontally, considering the belt or web being so disposed during collection of the fibers.

The quantity of glass fiber that is brought together in a laminated assemblage is dependent upon the density of the glass fibrous material that is to be produced. It has been determined that by controlling the density of the glass fibrous material it is capable of resiliently supporting pressures of a very broad range, but that each density of the material will support pressures only within certain ranges resulting in various degrees of compression of the glass fibrous material. For example, a glass fibrous material having a density of 1 pound per cubic foot will support pressures of from 0.1 pound per square inch at 15% deflection to about 1.5 pounds per square inch at 75% deflection. Glass fibrous material having a density of 20 pounds per cubic foot will resiliently support pressures from about 100 pounds per square inch at 15% deflection to about 1600 pounds per square inch at 65% deflection.

The assemblage of glass fibrous material is then placed between pressure plates to compress the assemblage of glass fibers to the desired density, as for example from 1 pound to 20 pounds per cubic foot. Also, the determined density of the glass fibrous material is established when the material is at a desired thickness or height, dependent upon the dimensions desired in the finished product.

While the glass fibrous material is held to a desired density at a desired dimension between the pressure plates, the binding agent on the glass fibers is activated or reactivated to cause a bonding between the glass fibers at their various points of contact. Thus, when the pressure is released from the so-treated glass fibrous material it will retain the dimension at which it was compressed.

The so bonded glass fibrous material is then placed between other pressure plates which stress load the bonded glass fibrous material to compress it to an extent not less than that at which it will be compressed when supporting the maximum load to be imposed on the material. A number of such cold working compressions or deflections are given to the material to stabilize the resilience factor of the material. This loading or stressing of the bonded glass fibrous material is occasioned in the same direction as that which will be occasioned upon the material when the supported load is applied.

The effect of the stress loading or cold working of the glass fibrous material is to eliminate the effect of any glass fibers in the material that tend to resist deflection of the material and to fracture those glass fibers that are improperly disposed in the material for cooperative resilient support of the load that is to be imposed on the material.

This stress loading of the glass fibrous material is effective to break or fracture the glass fibers that are improperly disposed in the glass fibrous material to the extent that they cannot flex to the extent required by the deflection of the material under the load to be applied. Such fibers will fracture or break and leave only the fibers that cooperate to support the load. This action of removing the fibers that tend to resist resilient action of the fibrous material results in stabilizing the resilience factor of the glass fibrous material.

Figure 5:
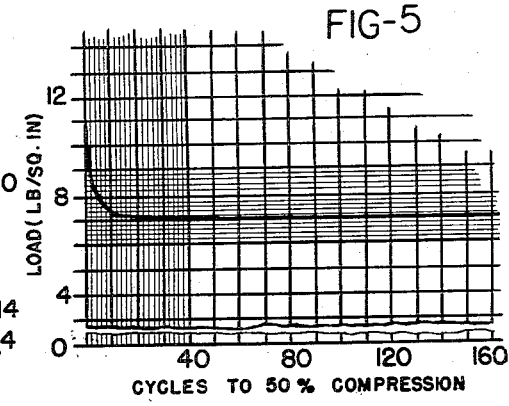
Figure 5 is a chart illustrating the stabilization curve of the glass fibrous material used in the body cushion.

For example, in Figure 5 there is illustrated a chart showing the result of cold working or compression cycling of the bonded glass fibrous material. The material tested consisted of bonded glass fibrous material of a density of 6 pounds per cubic foot which was compressed to 50% of its initial height and is to carry full load at 40% deflection. Normally cycling or cold working is carried 10% beyond the maximum deflection of the material under maximum load to stabilize the resilience value of the material under full load conditions.

As represented in the chart, it will be seen that the initial compression of the material to 50% of its initial height required a load of about 16 pounds per square inch. After the first two compression cycles the load required to compress the material to 50% of its height reduced to about 8 pounds per square inch. It will thus be seen that the maximum degree of stabilization of the resilience factor is obtained in the initial loadings or compression stressings of the material.

Thereafter, up to the first ten cycles of stress loadings the pressure required for loading changes only a minor amount, the pressure loading being reduced from about 8 pounds per square inch to slightly over 7 pounds per square inch. At this point the glass fibrous material is sufficiently stabilized that it can be said to be stabilized for all practical purposes. However, in the event for the need of extreme accuracy for the stabilization of the resilience factor, the material can be cycled an additional number of times until at about fifty cycles of stress loadings the product becomes fully stabilized for all practical purposes, even of extreme accuracies.

Figure 6:
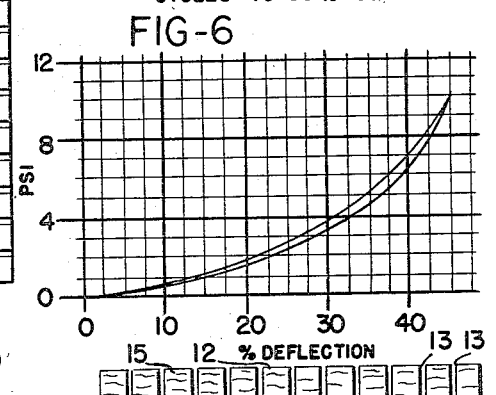
Figure 6 is a load deflection curve of the stabilized glass fibrous material used in the body cushion.

The stabilized product is now capable of producing repeat performance of spring loading with both a compression and extension of the material following substantially the same rate curve as shown by the typical load deflection curve of Figure 6. The amplitude of vibration absorption is regulated by the hysteresis loop shown on the load deflection curve. By varying the density of the material for a given load to be supported, and thereby varying the degree of compression or deflection of the material, various load deflection curves may be obtained with varying curve shapes on the hysteresis loop to secure the desired control over the amount of energy absorbed by the material in its deflection.

The load deflection curve of Figure 6 is that of a stabilized material of 6 pounds per cubic foot density under a maximum of 45% deflection stabilized by cold working or stress loading ten times. The original free height of the material being 0.999 inch, with the new free height after stress loading and stabilization being 0.994 inch.

The assemblage of the glass fibers coated with phenol-formaldehyde resin is a combination of 5% to 25% phenol-formaldehyde and 95% to 75% glass fibers, with the preferred product containing 15% phenol-formaldehyde and 85% glass fibers. The phenol-formaldehyde used as a binder is preferably of from 97% to 40% by weight of phenol, and 3% to 60% by weight of formaldehyde.

In curing the phenol-formaldehyde resin, for example, the glass fibrous material is heated to a temperature of about 300° F., but which can be varied from about 250° to 450° F. There is a loss of about 8% by weight of the phenol product during curing.

The material produced in accordance with the foregoing description can be used in the manufacture of body cushions or pads or like structures to support objects of irregular shape. Such a body cushion, or seat cushion, is illustrated in Figures 1 to 4.

The seat cushion or spring unit of Figures 1 to 4 consists of a body unit 10 of glass fibers, preferably processed as hereinbefore described, but if desired the cold working or stressing of the body of glass fibers can be omitted in those instances where extreme accuracy of deflection of the glass fiber body is not required, such as in seat cushions, mattresses and the like. The glass fibers of the body 10 are disposed generally in a common direction extending horizontally between the bottom face 11 and the upper face 12 of the cushion. Thus, the compression axis of the body 10 is in a vertical direction.

The body 10 has a plurality of slots 13 extending inwardly from the upper face 12 and partially through the body 10. As illustrated, these slots 13 are parallel to one another. Similarly, slots 14 are placed in the body 10 from the face 12 which intersect the slots 13, thereby forming a plurality of individual body elements 15 that are completely free from one another to act independently of one another. Each of the body portions 15 form an individual spring element which acts independently of the other spring elements. Thus when a body of irregular contour is placed upon the surface of the individual spring units 15, they will be deflected independently to support proportionately the weight that is applied on the cushion above the various spring elements.

By the construction of the cushion 10 as illustrated in the drawings, a highly flexible and resilient cushion is obtained which is capable of resiliently conforming to any irregular contour for support of the same. Glass fiber bodies constructed in the manner illustrated in this invention are readily usable for mattresses, seat cushions and the like.

It will be understood that the cushion body 10 can be provided with a suitable covering such as cloth, plastic or other material and the usual padding of sisal, cotton or other material can be used, the padding being applied over the cushion in the usual way.

When the slots 13 and 14 are cut into the body 10 the smaller body portions 15 thus have a resilience that is different from the main unsevered body portion of the cushion because of their individual smaller areas involved. Thus, the uncut portion 10a of the cushion 10 forms a firm but resilient support for the elements 15 which form individual springs for supporting a body.

Figure 7:
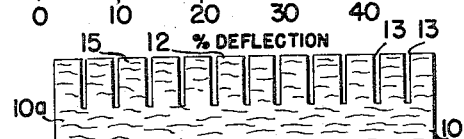
Figure 7 is a view of a modified positioning of the cushion.

In Figure 7 the cushion is illustrated in a modified position with the spring units 15 on the underside of the cushion so it can be used in this manner if desired.

While the cushion 10 of this invention has been illustrated as being formed from a body of glass fibers of uniform density, yet it will be understood that the density of glass fibers can be varied to obtain different values of resilience in different areas of the cushion.

The slots 13 and 14 are preferably fabricated into the cushion 10 by the use of high speed cutting tools, such as a saw, to sever the glass fibers cleanly along the slots and thereby leave the lay of the fibers undisturbed. Thus, the lay of the glass fibers in the individual springing elements 15 will be the same as in the unsevered portion 10a of the cushion.

While there is illustrated and described herein a preferred form of the invention, yet it is understood that modifications that fall within the scope of the appended claims are intended to be included herein.

We claim:

1. A glass fiber spring unit, comprising, a body unit of glass fibers bonded together at their points of juncture and resiliently compressible, said glass fibers constituting about 75 to 95% by weight of the spring unit, said body unit having a plurality of intersecting slots therein extending partially through the body unit subdividing the body portion containing the slots into a plurality of separately acting resiliently compressible spring units, said glass fibers being disposed generally in a plane parallel to the upper and lower surfaces of said body unit.

2. A glass fiber spring unit, comprising, a body unit of glass fibers bonded together at their points of juncture and resiliently compressible with the fibers disposed generally in a common direction through the body unit, said glass fibers constituting about 75 to 95% by weight of the spring unit, said body unit having a plurality of intersecting slots therein extending partially through the body unit angular to the general direction of lay of the glass fibers thereby subdividing the body portion containing the slots into a plurality of separately acting resiliently compressible spring units, said glass fibers being disposed generally in a plane parallel to the upper and lower surfaces of said body unit.

3. A glass fiber spring unit, comprising, a body unit of glass fibers bonded together at their points of juncture and resiliently compressible, said glass fibers constituting about 75 to 95% by weight of the spring unit, said body unit having a plurality of intersecting slots therein extending inwardly of the body unit from one face thereof and partially through the body unit subdividing the body portion containing the slots into a plurality of separately acting resiliently compressible spring units, said glass fibers being disposed generally in a plane parallel to the upper and lower surfaces of said body unit.

4. A glass fiber spring unit, comprising, a body unit of glass fibers bonded together at their points of juncture and resiliently compressible with the fibers disposed generally in a common direction through the body unit, said glass fibers constituting about 75 to 95% by weight of the spring unit, said body unit having a plurality of intersecting slots therein extending inwardly of the body unit from one face thereof and partially through the body unit angular to the general direction of lay of the glass fibers thereby subdividing the body portion containing the slots into a plurality of separately acting resiliently compressible spring units, said glass fibers being disposed generally in a plane parallel to the upper and lower surfaces of said body unit.

5. A glass fiber spring unit, comprising, a body unit of glass fibers bonded together at their points of juncture and resiliently compressible with the fibers disposed generally in a common direction generally parallel between opposite faces of the body unit, said glass fibers constituting about 75 to 95% by weight of the spring unit, said body unit having a plurality of intersecting slots therein extending inwardly of the body unit and partially through the same and angular to the lay of the fibers in the body unit thereby subdividing the body portion containing the slots into a plurality of separately acting resiliently compressible spring units, said glass fibers being disposed generally in a plane parallel to the upper and lower surfaces of said body unit.

6. A glass fiber spring unit, comprising, a body unit of glass fibers bonded together at their points of juncture and resiliently compressible with the fibers disposed generally in a common direction generally parallel between opposite faces of the body unit, said body unit comprising by weight about 5 to 25% phenol formaldehyde resin and 75 to 95% glass fibers, said body unit having a plurality of intersecting slots therein extending inwardly of the body unit and partially through the same and normal to the lay of the fibers in the body unit thereby subdividing the body portion containing the slots into a plurality of separately acting resiliently compressible spring units, said glass fibers being disposed generally in a plane parallel to the upper and lower surfaces of said body unit.

7. A body cushion, comprising, a body unit of glass fibers bonded together at their points of juncture and resiliently compressible, said body unit comprising by weight about 5 to 25% phenol formaldehyde resin and 75 to 95% glass fibers, said body unit having a plurality of intersecting slots therein extending partially through the body unit subdividing the body portion containing the slots into a body of separately acting resiliently compressible spring units, said glass fibers being disposed generally in a plane parallel to the upper and lower surfaces of said body unit.

8. A body cushion, comprising, a body unit of glass fibers bonded together at their points of juncture and resiliently compressible with the fibers disposed generally in a common direction through the body unit, said body unit comprising by weight about 5 to 25% phenol formaldehyde resin and 75 to 95% glass fibers, said body unit having a plurality of intersecting slots therein extending partially through the body unit angular to the general direction of lay of the glass fibers thereby subdividing the body portion containing the slots into a plurality of separately acting resiliently compressible spring units, said glass fibers being disposed generally in a plane parallel to the upper and lower surfaces of said body unit.

9. A glass fiber spring unit, comprising, a body unit of glass fibers bonded together and forming a unit having a uniform density throughout the depth of the body and resiliently compressible, said body unit comprising by weight about 5 to 25% phenol formaldehyde resin and 75 to 95% glass fibers, said body unit having a plurality of intersecting slots therein extending partially through the depth of the unit thereby establishing a plurality of separately acting small body portions with resilience different from that of the unslotted body portion, said bonded glass fibers forming a multiplicity of cantilever springs throughout said unit.

10. A body cushion, comprising, a body unit of glass fibers bonded together and forming a unit having a uniform density throughout the depth of the body and resiliently compressible, said body unit comprising by weight about 5 to 25% phenol formaldehyde resin and 75 to 95% glass fibers, said body unit having a plurality of intersecting slots therein extending partially through the depth of the unit thereby establishing a plurality of separately acting small body portions with resilience different from that of the unslotted body portion, said bonded glass fibers forming a multiplicity of cantilever springs throughout said unit.

11. A method of producing a glass fiber spring unit including the steps of, fabricating a body unit of glass fibers bonded together at their points of juncture and resiliently compressible, said body unit comprising by weight about 5 to 25% phenol formaldehyde resin and 75 to 95% glass fibers, and fabricating into said body unit a plurality of slots extending partially through the body unit establishing thereby a plurality of separately acting springy portions.

12. A method of producing a glass fiber spring unit including the steps of, fabricating a body unit of glass fibers bonded together at their points of juncture and resiliently compressible, said body unit comprising by weight about 5 to 25% phenol formaldehyde resin and 75 to 95% glass fibers, and cutting into said body portion from one face thereof a plurality of slots extending partway into the body portion thereby producing a plurality of separately acting springy body portions which are integral with the unsevered body portion.

13. A method of producing a glass fiber spring unit including the steps of, fabricating a body unit of glass fibers bonded together forming a body unit of uniform density and resiliently compressible, said body unit comprising by weight about 5 to 25% phenol formaldehyde resin and 75 to 95% glass fibers, and fabricating into the body unit from one side thereof a plurality of slots extending partially through the body unit thereby producing separately acting body portions which are integral with the unslotted body portion.

14. A method of producing a glass fiber spring unit including the steps of, fabricating a body unit of glass fibers bonded together forming a body unit of uniform density and resiliently compressible with the lay of the glass fibers being generally in a common direction, said body unit comprising by weight about 5 to 25% phenol formaldehyde resin and 75 to 95% glass fibers, and fabricating into the body unit from one side thereof a plurality of slots extending partially through the body unit angular to the lay of the glass fibers thereby producing separately acting body portions which are integral with the unslotted body portion.

15. The method of producing a glass fiber cushioning unit, consisting of the steps of, producing a resilient assemblage of glass fibers bonded together forming a mass of uniform density, said body unit comprising by weight about 5 to 25% phenol formaldehyde resin and 75 to 95% glass fibers, stress loading the bonded assemblage to resiliently compress the same to a value at least equal to the load thereby imposed on the assemblage, and fabricating into the assemblage from one side thereof a plurality of slots partially through the assemblage and in crossing relationship thereby providing a plurality of separately acting springy glass fiber body portions integral with the unsevered body portion.

16. A body cushion composed of a body of glass fibers bonded together at their points of juncture and forming a multiplicity of cantilever springs for resilient action and slotted from one face of the body transversely and longitudinally thereof and partially through the body thereby producing independently acting resilient glass fiber bodies on one side of the cushion, said glass fibers constituting about 75 to 95% by weight of said cushion and the remainder consisting of resinous bonding material.

17. A glass fiber spring unit, comprising, a compressible body unit of substantially uniform density of glass fibers bonded together and resiliently compressible, said body unit having a plurality of slots therein extending partially through the body unit subdividing the body portion containing the slots into a plurality of separately acting resiliently compressible spring units.

References Cited in the file of this patent

UNITED STATES PATENTS

| | | |
|---|---|---|
| 2,002,399 | Kaden | May 21, 1935 |
| 2,325,026 | Anway | July 27, 1943 |
| 2,331,146 | Slayter | Oct. 5, 1943 |
| 2,338,839 | Coss | Jan. 11, 1944 |
| 2,371,788 | Weeber | Mar. 20, 1945 |
| 2,375,182 | Anway | May 8, 1945 |
| 2,489,242 | Slayter et al. | Nov. 22, 1949 |
| 2,785,739 | McGregor et al. | Mar. 19, 1957 |

FOREIGN PATENTS

| | | |
|---|---|---|
| 403,249 | Great Britain | Dec. 21, 1933 |
| 476,678 | Great Britain | Dec. 8, 1937 |